PATTERN TRACING APPARATUS WITH CROSSLINE DETECTION CIRCUIT

Filed Jan. 13, 1965 3 Sheets-Sheet 1

INVENTORS
Francis G. Bardwell.
Robert A. Payne.

By William J. Newman
Attorney

PATTERN TRACING APPARATUS WITH CROSSLINE DETECTION CIRCUIT

Filed Jan. 13, 1965

INVENTORS
Francis G. Bardwell.
Robert A. Payne.

By William J. Newman
Attorney

Feb. 13, 1968 F. G. BARDWELL ET AL 3,369,123

PATTERN TRACING APPARATUS WITH CROSSLINE DETECTION CIRCUIT

Filed Jan. 13, 1965 3 Sheets-Sheet 3

INVENTORS
Francis G. Bardwell.
Robert A. Payne.

By William J. Newman
Attorney

United States Patent Office 3,369,123

Patented Feb. 13, 1968

3,369,123
PATTERN TRACING APPARATUS WITH CROSSLINE DETECTION CIRCUIT

Francis G. Bardwell, Chicago, and Robert A. Payne, Des Plaines, Ill., assignors to Stewart-Warner Corporation, Chicago, Ill., a corporation of Virginia Filed Jan. 13, 1965, Ser. No. 425,234
17 Claims. (Cl. 250—202)

This invention relates to pattern tracing devices which are useful to guide pattern cutting machines such as torch cutters, milling machines, wood cutting machines, cloth material cutters and the like.

More particularly this invention relates to the automatic control of pattern tracing apparatus by which a pattern contour sensing device automatically follows along a pattern contour on a drawing (such as a line) until an inconsistency in the pattern (such as a crossline or gap) occurs. At that point the sensing device stops its movement in a precise position with respect to the inconsistency.

The earliest prior art devices of this type generally did not have facilities for controlling forward motion along the pattern contour. They followed along the pattern and continued on beyond the pattern until an operator stopped the device. Later machines were developed to include controls for stopping upon the detection of a code mark or a gap in the pattern contour. When the sensing head of such a device encountered the code mark or pattern gap, the motive means therefor deenergized and the apparatus coasted to a stop at some generally indeterminable point beyond the reference mark. Such devices were adequate for performing complete pattern tracing operations and stopping at the end of the pattern but not for the precise positioning and added programming enabled by the present invention.

The present invention permits much more flexibility in the control of machine tools. Since the machine tool may be guided to precise points, control programming of many functions in addition to the pattern tracing is possible. For example, the tracer apparatus may be used with a machine tool so that it will not only cut a profile pattern on the workpiece, but will stop at predetermined points along the pattern to allow the performance, either manual or automatic, of further operation such as drilling holes or the like. The ability to precisely position tracing apparatus along its direction of travel provides almost unlimited flexibility in the automation of fabricating complex articles, It is therefore an object of this invention to provide apparatus which greatly extends the flexibility of automatic control by pattern contour tracing technique.

It is also an object of this invention to provide pattern tracing apparatus which may be controlled to accurately position itself in the direction of travel of the device.

Another object of this invention is to provide line tracer apparatus which will follow along the center of a pattern line until a crossline is encountered at which point the scanning device will accurately position itself with respect to the crossline.

Another object of this invention is to provide economical means for providing crossline positioning control for line tracer apparatus.

Other objects and advantages of this invention will become apparent with a further reading of this specification, especially when taken in view of the accompanying drawings in which.

Figure 2:
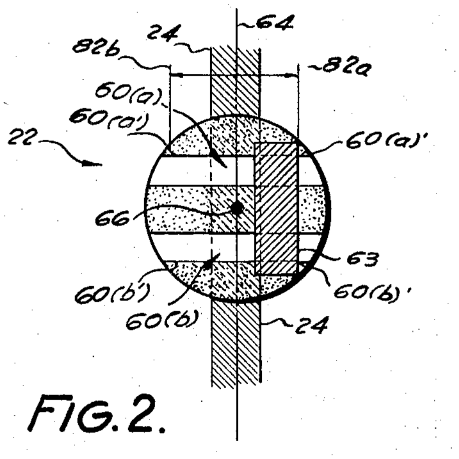
FIG. 2 is a schematic portrayal of a line scanning device which is angularly and positionally aligned with the center of the pattern line.
Figure 4A:
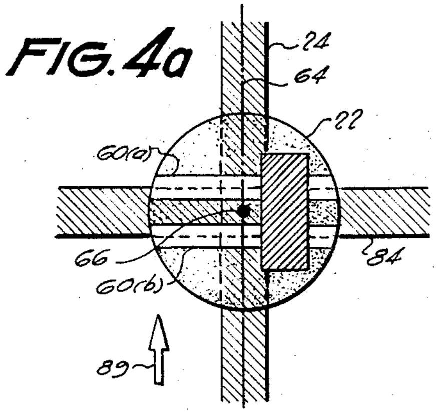
Figure 5A:
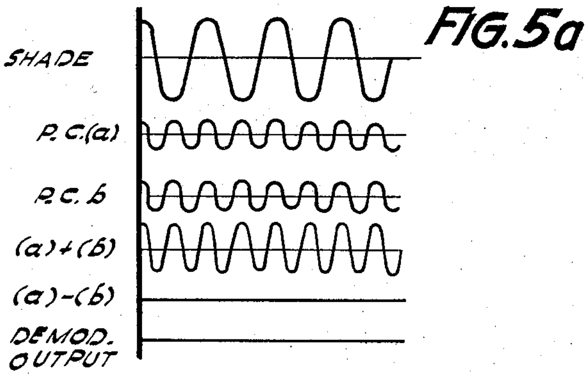
Figure 4B:
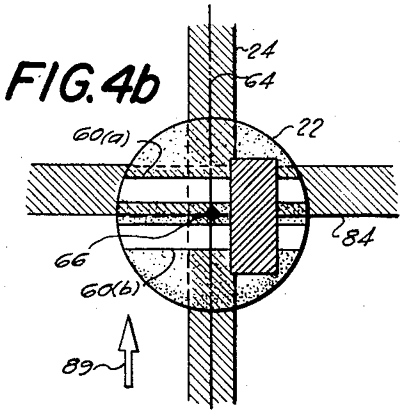
Figure 5B:
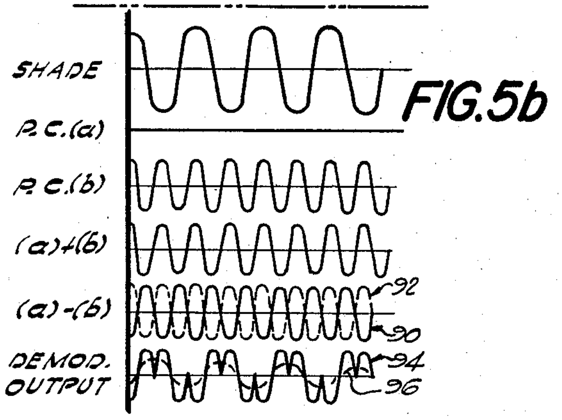
Figure 4C:
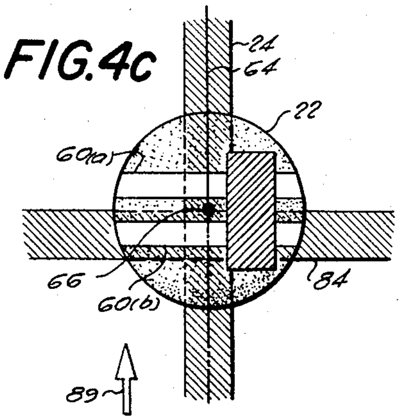
Figure 5C:
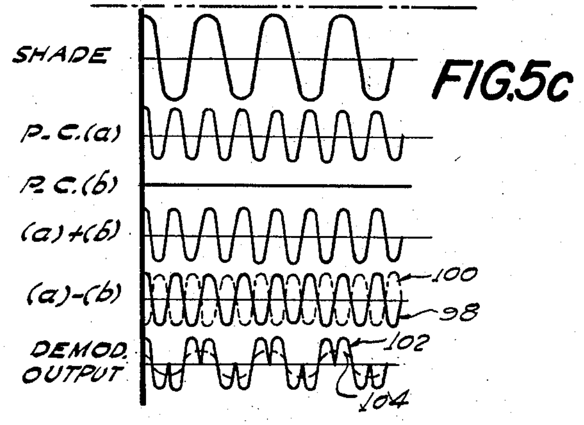
Figure 6:
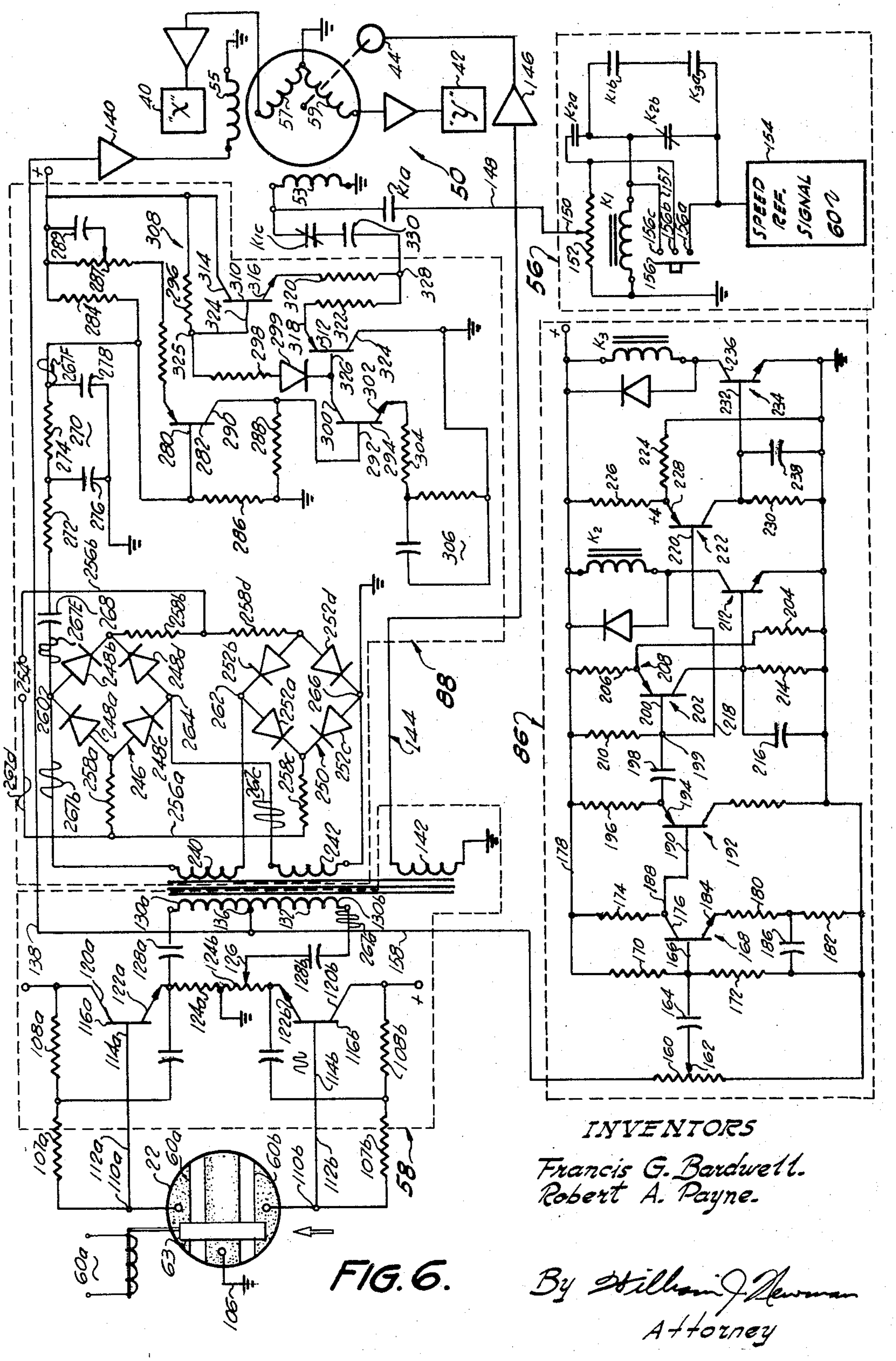

FIGS. 4*a*, 4*b* and 4*c* are schematic portrayals of the scanning device of FIG. 2 at representative positions with respect to the pattern line and a crossline thereto;

FIG. 5 is a graphical representation of various waveforms at various points in the system and correspond to the various positions of the sensing means with respect to the crossline shown in FIGS. 4*a*–4*c*; and FIG. 6 is a schematic diagram of the circuitry for a preferred embodiment of this invention.

In accordance with this invention a pattern line tracer is provided with a sensing head which scans at a predetermined frequency separate segments of the pattern line forward and behind the center of scan. An electric signal output of the predetermined frequency is derived from the sensing head which is indicative of the positional relationship of the center of scan with the image of the pattern line being traced. Means responsive to the position indicating signal drive the sensing head in a forward direction along the line. The output also includes even harmonic components of the predetermined frequency which are used in the detection of an inconsistency in the pattern line, such as a gap or a crossline. The detection of the inconsistency causes the deactivation of the first sensing head driving means and activates a second driving means which causes the sensing head to be accurately positioned with respect to the inconsistency.

Examples of pattern contour sensing means which may be employed in the practice of this invention are disclosed in the copending application of Frans Brouwer, Ser. No. 61,596, filed Oct. 10, 1960, now issued as U.S. Patent 3,213,282. It is to be understood that the sensing devices shown therein are not the only types which would operate in the practice of this invention, but for matters of convenience the following description will refer primarily to such devices.

Figure 1:
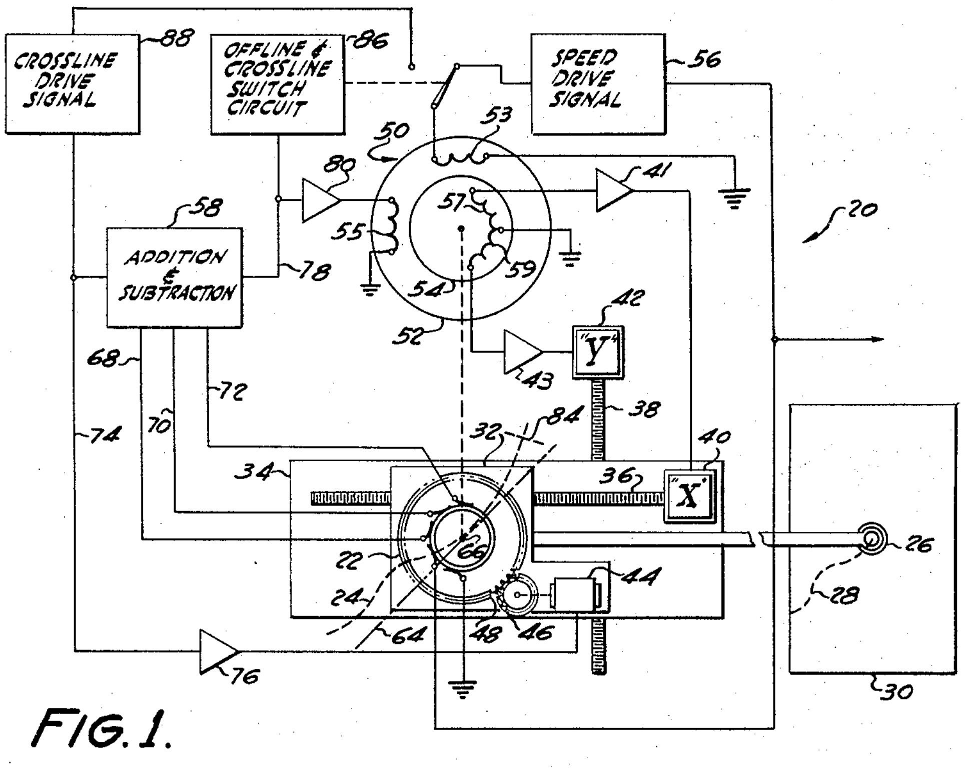
FIG. 1 is a block diagram of a line tracing system utilizing the teachings of this invention.

Describing now a preferred embodiment of the invention, FIG. 1 shows a line tracing system 20 comprising a sensing head 22 following the line 24 and causing a work tool 26 such as a gas torch, a milling machine cutter or the like, to reproduce a similar line 28 in a workpiece 30. The sensing head is rotatably mounted on a carriage 32 which is longitudinally translatable along the second carriage 34 by means of a lead screw 36 and servo motor 40 (hereinafter referred to as the X motor) mounted on the carriage 34. The carriage 34 is translatable in a direction perpendicular to the translation of carriage 32 by means of lead screw 38 and servo motor 42 (hereinafter referred to as the Y motor).

The sensing head 22 is rotatably driven about axis 66 by servo motor 44 through an idler gear 46 which is in engagement with a gear 48 fixed to the sensing head 22. A rotary transformer or resolver 50 having a fixed stator 52 is connected to the sensing head 22 so that its rotor 54 is rotatable therewith. The resolver 50, during normal operation, provides drive signals to the X and Y servo motors 40, 42 which are resolved from the relationship between the reference speed drive signal from circuit 56 and an output signal from the addition and subtraction circuit 58 as hereinafter described.

The preferred embodiment of this invention employs a double photocell sensing head of the type described in the referenced Brouwer patent as hereinbefore mentioned. Briefly the sensing head 22 has two elongated sensitive areas, 60*a*, 60*b* (FIG. 2) which are oriented transverse to the front-to-back axis 64 of the sensing head 22, and spaced substantially equally forward and behind the axis of rotation 66 of the sensing head 22. An opaque shade or shutter 63 having a width approximating that of the pattern line image is caused to oscillate back and forth across the front-to-back axis 64 and along the direction of elongation of the sensitive areas 60, 62 to modulate the image of the pattern line 24 received by the sensitive areas 60*a*, 60*b*.

As described in the previously mentioned Brouwer patent, the addition of the two signals provided by the sensitive areas 60*a* and 60*b* results in a summation signal whose predetermined frequency component is indicative of the transverse deviation of the center of the pattern line 24 from the center of scan of the sensing head. The center of scan of the sensing head is represented by a point on the front-to-back axis 64 midway between the sensitive areas 60*a* and 60*b*, shown in FIG. 2 as coinciding with the sensing head axis of rotation 66. Subtraction of the signals from the photosensitive areas 60*a*, 60*b* results in a difference signal whose predetermined frequency component is indicative of the angular deviation between the front-to-back axis 64 and a tangent to the segment of the pattern line 24 being sensed by the sensitive areas 60*a*, 60*b*. Referring again to FIG. 1, the respective signals from the two sensitive areas 60*a* and 60*b* in the sensing head are transmitted by lines 68, 70 and 72 to addition and subtraction circuit 58. The difference signal is supplied through conductor 74 and amplifier 76 to the servo motor 44, which rotates the sensing head 22 to align its front-to-back axis 64 with the pattern line 24.

The sum signal from the addition and subtraction circuit 58 is carried by conductor 78 through amplifier 80 to a position signal stator winding 55 in the resolver 50. This signal along with the reference signal from the speed drive signal source 56 on stator winding 53 induce properly phase and amplitude oriented signals in rotor windings 57 and 59 so that the X and Y motors 40, 42 connected thereto through amplifiers 41 and 43 respectively, drive the sensing head 22 along the pattern line 24 at a constant velocity. Thus, during normal operation the sensing head is driven at a constant velocity along the center of the pattern line and its front-to-back axis is maintained in angular alignment therewith. The portion of the apparatus hereinbefore described is part of the prior art as described in the Brouwer patent.

The present invention is directed toward the addition thereto and combination therewith of means for detecting an inconsistency in the pattern line such as crossline 84 and for driving the scanning head 22 so as to accurately position it with respect to the crossline. An offline and crossline switching circuit 86 (FIG. 1) is provided which upon the detection of a crossline by the sensing head 22 switches the drive signal winding 53 of the resolver 50 from the output of the reference speed drive signal circuit 56 to the output of a crossline drive signal circuit 88. The offline and crossline switching circuit 86 and the crossline drive signal circuit 88 are driven by harmonic components of the sum signal and the difference signal outputs of the addition and subtraction circuit 58 in a manner to be hereinafter described. To facilitate an understanding of the operation of these circuits the generation of the harmonic components of the signals will now be discussed.

Figure 3:
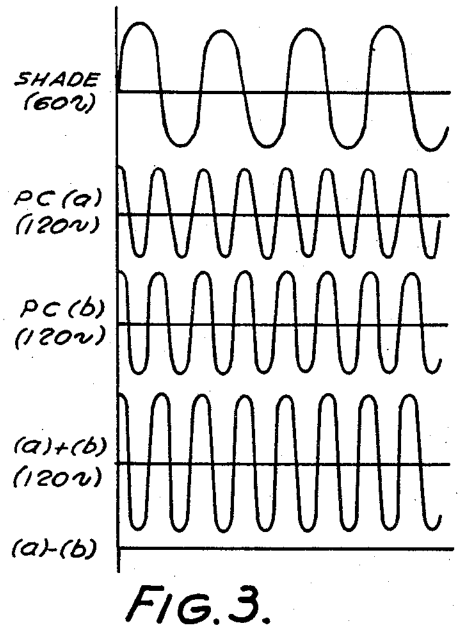
FIG. 3 is a graphical representation of second harmonic waveforms at various points in the system and their relationship with the fundamental frequency waveform determined by the oscillations of the scanning means.

When the sensing head is following the center of the pattern line as shown in FIG. 2 the sensitive areas 60*a* and 60*b* each produce output signals having a frequency twice that of the predetermined frequency established by the vibration of the shade 63. In describing the generation of the waveforms in FIG. 3 by the sensing means of FIG. 2, zero amplitude of the shade oscillation is selected as the point at which the shade 63 is aligned with the front-to-back axis 64 of the sensing head. The limit marks 82*a*, 82*b* correspond to the positive and negative maximums, respectively, of the oscillating shade waveform of FIG. 3.

It can be seen that when the oscillating shade 63 is aligned with the pattern line 24, and the front-to-back axis 64 is also aligned therewith, maximum light is projected on the sensitive areas 60*a* and 60*b* by the portions 60*a'* and 60*b'* thereof on either side of the image of the pattern line 24. Minimum light intensity is received on the photosensitive areas 60*a* and 60*b* when the oscillating shade 63 is at one or the other of its maximum limit positions 82*a* or 82*b*. Therefore the waveforms for the separate sensitive areas are as shown and labeled PC($a$) and PC($b$) in FIG. 3. Thus, when the sensing head 22 is aligned with the pattern line image only the second harmonic components are present in the sensitive area output signals.

The crossline switching circuit 86 and the crossline drive signal circuit are operative responsive to the second harmonic components of the sum and difference signal output of the circuit 58. When the sensing head is aligned with the pattern line image the sum and difference signals appear as labeled $(a)+(b)$ and $(a)-(b)$ in FIG. 3. The sum signal is a second harmonic of the predetermined frequency with an amplitude of approximately twice that of one of the sensitive area signals PC($a$) or PC($b$). This amplitude will be defined as $(A+B)$ for purposes which will become apparent. The amplitude of the difference signal $(a)-(b)$ in this condition is of course zero.

It will be noted that the sum signal $(a)+(b)$ will have a second harmonic component as long as a pattern line 24 is being viewed by the photosensitive areas 60*a*, 60*b*. However, if no image of the pattern line 24 is projected on the photosensitive areas the light intensity on them will not vary as the shade vibrates between its extreme positions and the sum difference signals of the second harmonic components will both be zero.

FIGS. 4*a*, *b* and *c* along with FIGS. 5*a*, *b* and *c* represent the effect on the waveforms when the crossline 84 is detected on the photosensitive areas 60*a* and 60*b*.

FIG. 4*a* depicts the condition when the scanning head 22 is centered with respect to the crossline 84 so that the sensitive areas 60*a* and 60*b* view equal portions of the crossline 84. Thus, the output for the separate sensitive areas 60*a* and 60*b* as represented by the waveforms PC($a$) and PC($b$) contain second harmonic components which are equal in amplitude and in phase with one another. The sum of these two signals as represented by the waveform $(a)+(b)$ is used to activate the offline and crossline switch circuits 86 to disconnect the speed drive signal 56 from the resolver and connect the crossline drive signal circuit 88 thereto. It is to be noted that the amplitude of the $(a)+(b)$ signal in FIG. 5*a* is approximately half the amplitude of the $(a)+(b)$ signal of FIG. 3 or $\frac{1}{2}(A+B)$. It is this difference in amplitude, along with the fact that there is no signal when the line is lost to the sensitive areas, which enables the offline and crossline switching circuit to distinguish between the condition when a crossline is encountered or a break in the line is encountered.

The difference of the two signals as represented by the waveform $(a)-(b)$ is of course zero for the condition when the sensing head is centered on the crossline 84 and it is this difference signal $(a)-(b)$ which is used in the crossline drive signal circuit 88 to provide the drive signals to the resolver for moving the apparatus to center the sensing head 22 over the crossline 84.

The FIG. 4*b* represents the condition when the sensing head 22, moving in a forward direction represented by arrow 89 encounters the crossline 84 such that sensitive area 60*a* is covered by the image of the line 84. Sensitive area 60*a* viewing the crossline 84 will have a substantially zero signal as indicated by waveform PC($a$) in FIG. 5*b*. Sensitive area 60*b*, not encountering the crossline 84, has a second harmonic component which is equal in amplitude to the signal generated thereby in the condition of no crossline of FIGS. 2 and 3 as represented by waveform PC($b$) of FIG. 5*b*. Waveform $(a)+(b)$ is the sum of the PC($a$) and PC($b$) signals of FIG. 5*b* and has an amplitude of approximately $\frac{1}{2}(A+B)$.

The solid line waveform labeled 90 in FIG. 5*b* represents the true difference signal $(a)-(b)$. The addition and subtraction circuit 54 also generates a signal of opposite phase and equal amplitude to the difference signal $(a)-(b)$ as shown by the dotted line signal waveform 92 shown in FIG. 5*b*.

The two signals 90 and 92 are combined in a diode demodulator in the crossline drive signal circuit 88 to produce an output signal having a waveform such as depicted by the solid line waveform 94 in FIG. 5*b*. It will be seen that this signal has a fundamental frequency component as represented by the dotted line waveform 96, and it is the phase and amplitude of this fundamental component 96 which is indicative of the direction and amount respectively of the deviation of the center of scan 66 from the center of the crossline 84.

FIG. 4*c* represents the conditions in which the sensing head 22 moving in the direction of arrow 89 has overshot the crossline 84 so that only sensitive area **60*b* views the crossline. In this case the output signal for photocell sensitive area 60*b* is zero while that for sensitive area 60*a*** is as shown by the waveform PC$(a)$ in FIG. 5*c*. The $(a)+(b)$ signal is approximately the same as that shown for the condition of FIGS. 4*b* and 5*b* but the difference signal $(a)-(b)$ is 180° out of phase from the difference signal of the condition shown in FIGS. 4*b* and 5*b*. The true $(a)-(b)$ signal is represented by the solid line waveform 98 in FIG. 5*c* and the opposite phase generated signal is depicted by the dotted line waveform 100. The diode demodulator output is shown by the solid line waveform 102 and its fundamental frequency component is the dotted line waveform 104. The fundamental frequency component 104 in the condition of FIG. 4*c* is opposite in phase to the fundamental component signal 96 of condition FIG. 4*b* indicating that the center of scan 66 is forward of the center of the crossline 84.

These fundamental component signals 96 and 104 are provided to the drive signal winding of the resolver 50 which energizes the servo motors 40 and 42 to align the sensing head 22 with the crossline 84. As the sensing head approaches the crossline a signal is provided by the crossline drive signal circuit to continue the advancement toward the line. If the sensing head overshoots a reverse phase signal drives the sensing backward toward the line. When the sensing head aligns itself with the crossline the outputs of the sensitive areas are equal and no difference signal is available to the resolver and the device stops.

*Circuit description*

Reference is now made to FIG. 6 for a detailed description of the electronic circuitry of the preferred embodiment of this invention. The sensing head 22 comprises a dual type photocell of the photo-resistant type which operates as two separate photocells associated with each of the photosensitive areas **60*a* and 60*b*. The vibrating shade which modulates the image of the pattern line on the sensitive areas 60*a* and 60*b*** is driven by an alternating current source which might be ordinary commercial 60 cycle, single phase source. It is to be understood that any other photocell type either of dual construction or employing two elements may be adapted for use in this invention.

The sensitive areas **60*a* and 60*b* have a common ground connection 106 and each is connected through respective voltage dividing resistors 107*a*** or *b*, **108*a*** or *b* to a positive DC electrical source. The respective outputs at junctions **110*a*** and *b* of the sensitive areas **60*a* and 60*b* are directly connected through conductors 112*a*** and *b* to the bases **114*a*** and *b* of transistors **116*a*** and *b*. The transistors **116*a*** and *b* are connected as emitter follower amplifiers with their respective collectors **120*a*** and *b* connected to positive DC voltage, and their respective emitters **122*a*** and *b* connected through resistances **124*a* and 124*b* to ground. The resistance 124*b* in the emitter circuit for transistor 116*b* is a potentiometer with the arm 126 providing the output for connection through capacitor 128*b* to the end 130*b* of the primary 132 of transformer 134. The output from transistor 116*a* is taken directly from the emitter 122*a* and supplied through capacitor 128*a* to the end 130*a* of transformer primary winding 132. The potentiometer 124*b*** serves as a balance adjustment for the two transistor circuits.

The current at the center tap 36 of the primary of transformer 134 is proportional to the sum of the outputs of the two amplifiers **116*a*** and *b* and hence, the sum signal $(a)+(b)$ appears at this point. It is carried to the position signal stator winding 55 of the resolver 50 through conductor 138 and amplifying means 140 where it cooperates with the speed signal on the quadrature wound stator winding 53 to induce signals in the rotor windings 57, 59 so that the X and Y drive motors will translate the sensing head along the line.

The speed reference drive signal is supplied to the quadrature stator winding 53 from the speed reference drive circuit 56 through contacts K1*a* of the drive selector relay K1 in the reference speed drive signal circuit 56. The contacts K1*a* are connected through conductor 148 to the arm 150 of a speed selecting potentiometer 152. The speed potentiometer 152 is series connected with contacts K2*a* of an offline relay K2, contacts K1*b* of selector relay K1 and contacts K3*a* of a crossline relay K3 between a speed reference signal source 154 and ground. The speed reference signal source may be an ordinary commercial 60 cycle, single phase source and is preferably the same one used to drive the oscillatory member 63 in the sensing head. The relay coil K1 is connected across the speed potentiometer 152 and contacts K2*a*. Normally closed contacts K2*b* of offline relay K2 normally connect coil K1 across the power source 154. A manually operable start and override switch 156 is provided with contacts **156*a* and 156*b*** across the three contacts K1*b*, K2*a* and K3*a* so that upon operation of the button switch power will be supplied to the quadrature winding 53. Contact **156*c* and conductor 157** are provided to enable the energization of coil K1 if the scanner is over a line when the equipment is first turned on.

The contacts K1*b* and K3*a* provide a lock circuit for the drive selector relay K1. During normal operation when when the sensing head is following along a line these contacts will be closed to maintain relay K1 energized. Contacts K2*a* and K1*a* will also be closed to supply the speed reference signal to the resolver. Normally closed contacts K1*c* of the drive selector K1 are maintained open during normal operation to disconnect the crossline drive signal circuit 88 from the resolver.

As previously mentioned the motor 44 maintains the rotor in proper angular orientation with respect to the direction of the line and receives its drive signal, that is the $(a)-(b)$ difference signal from a secondary 142 of the transformer 134. The signal from the secondary 142 is carried by way of conductor 144 and amplifier means 146 to the rotational motor 44.

*Offline and crossline switching circuit*

The offline and crossline detector circuit 86 controls the automatic operation of the drive selector relay K1 to control the drive signal source connection to the resolver. It receives its input signal from the center tap 136 of transformer primary 134 which, it will be recalled, is the sum signal $(a)+(b)$. Conductor 158 connects the primary center tap 136 of transformer 134 to one end of potentiometer 160, the other end being connected to ground. The potentiometer 160 serves as a signal attenuator to permit proper calibration of the offline and crossline switching circuit 86 with respect to the particular pattern being traced. The sum signal is coupled from the arm 162 of potentiometer 160 through capacitor 164 to the base 166 of transistor 168, connected as a common emitter, Class A amplifier. Resistors 170 and 172 provide bias and stabilization for the circuit, and resistor 174 connected between the collector 176 and positive DC potential on conductor 178 serves as the load resistor. Resistors 180 and 182 connected betwen the emitter 184 and ground along with capacitor 186 serve to provide a slight amount of negative feedback to minimize distortion and provide stabilization.

The output from the collector 176 of transistor 168 is directly coupled by conductor 188 to the base 190 of emitter follower transistor 192. The output is taken from the emitter 194 which is connected through resistor 196 to the positive DC conductor 178, capacitor 198 coupling the signal through junction 199 to the base input 200 of transistor 202. Transistor 202 is biased Class C by virtue of input resistor 210 and the voltage divider resistors 204, 206 connected to the emitter 208. An offline relay driver transistor 212 has its input connected across the load resistor 214 in the collector circuit of transistor 202. Capacitor 216 is connected across load resistor 214 to integrate the collector signal of transistor 202 and provide forward bias to offline relay driving transistor 212 whenever a sum signal is being received by the offline and crossline circuit 86. Offline relay K2 in the collector circuit of transistor 212 is maintained energized when transistor 212 is driven into conduction by the forward bias.

The signal appearing at junction 199 is also connected through conductor 218 directly to the base 220 of transistor 222. This transistor is also reverse biased by means of the input resistor 210 and the voltage dividing resistors 224 and 226 connected to the emitter 228. The bias on this transistor is substantially greater than that on transistor 202 for the purposes to be hereinafter described. The output across load resistor 230 in the collector circuit of transistor 222 is directly connected to the base of crossline relay driver transistor 234 and crossline relay K3 is directly connected between the collector 236 and the positive DC potential conductor 178. Load resistor 230 in conjunction with capacitor 238 serve as an integrater to provide forward bias to the relay driver transistor 234 to maintain it in conduction whenever the amplitude of the signal at junction 199 is sufficient to overcome the bias of transistor 222.

The operation of the offline and crossline switching circuit 86 will now be described. It will be recalled in the discussion of FIGS. 2 and 3 which show the scanning head 22 viewing the pattern line 24 in the absence of a crossline 84 and the attendant waveforms, that the sum signal $(a)+(b)$ contains a second harmonic component of the predetermined scanning frequency whenever the pattern line is being viewed, and that no sum signal is produced when the pattern line is not being sensed. This sum signal is sufficient to maintain both the offline relay K2 and the crossline relay K3 energized when the sensing head 22 is travelling along the pattern line 24 without encountering a crossline as its amplitude is equal to $(A+B)$. The amplified signal appearing at point 199 is sufficient to drive both transistors 202 and 222 into conduction so that forward bias is provided to the relay driver transistors 212 and 236 to energize the relays K2 and K3.

Thus, the energization of offline relay K2 and crossline relay K3 serves to maintain completed the locking circuit for relay K1 by means of the relay contacts K1*b* and K3*a* and the speed reference signal source 154 is maintained connected through the speed potentiometer 152 to the resolver for driving the sensing head at a constant speed drive along the pattern line.

If, however, the sensing head 22 strays off of the pattern line 24, or comes to a gap in the pattern line, the sum signal $(a)+(b)$ is zero and the energization currents for the offline relay K2 and crossline relay K3 are lost. Contacts K2*a* open, contacts K3*a* in the hold circuit for drive selector relay K1 open, relay K1 deenergizes and contacts K1*a* open to cut the speed reference signal from the resolver 50 so that device stops its forward movement.

When the sensing head encounters a crossline 84 as it moves forward along the pattern line 24 such that the forwardmost sensitive areas 60*a* only is viewing the line such as shown in FIG. 4*b*, a sum signal $(a)+(b)$ having an amplitude of $\frac{1}{2}(A+B)$ is produced. The reverse bias on transistor 220 in the offline and crossline switching circuit 86 is selected such that a sum signal of amplitude $\frac{1}{2}(A+B)$ is insufficient to drive it into conduction to provide a forward bias of transistor 234. The crossline relay K3 is therefore deenergized and contacts K3*a* in the speed signal drive circuit 56 open to remove the speed drive signal from the resolver. Contacts K1*c* of the drive selector relay K1 close however to connect the output of the crossline drive circuit 58 to the resolver and a drive signal is produced therein for driving the sensing head to center on the crossline 84 as hereinafter described.

*Crossline drive signal circuit*

The crossline drive signal circuit 88 is operative responsive to the second harmonic component in the difference signal $(a)-(b)$ for providing a signal to the drive winding 53 of resolver 50 to position the sensing head with respect to the crossline. The phase and amplitude of the output signal of the circuit 88 are respectively indicative of the direction and amount of deviation of the center of scan of the sensing head 22 from the center of the crossline 84.

The difference signal $(a)-(b)$ is mutually induced across equal but oppositely wound secondary windings 240, 242 of transformer 134. Thus, these windings provide equal but oppositely phased difference signals $(a)-(b)$ to the inputs of a diode demodulator circuit 244 in accordance with waveforms 90, 92, 98 and 100 in FIG. 5.

The diode demodulator 244 comprises a first set 246 of bridge connected diodes 248*a* through *d* and a second set 250 of bridge connected diodes 252*a* through *d*. These sets are connected in parallel across a reference signal source at terminals 254 by means of conductors 256*a* and *b* and dropping resistors 258*a* through *d*. The reference signal source at terminals 254 is preferably the same source which drives the vibrating oscillating shade 63 and which provides the speed reference signal at 154. The diodes in the two sets 246 and 250 are respectively oriented so that they are forward biased into conduction during opposite half cycles of the reference voltage signal at terminals 254.

The two secondary windings 240 and 242 provide the input to the demodulator 244 and are respectively connected so that the upper end of winding 240 is connected to the terminal 260 between diodes 248*a* and 248*b*, the lower end of winding 240 is connected to the junction 262 between diodes 252*a* and 252*b*, the upper end of winding 242 is connected to the junction 264 between diodes 248*c* and 248*d*, and the lower end of winding 242 is connected to junction 266 between diodes 252*c* and 252*d*. The output of the diode demodulator 244 appears between the junction 260 and the grounded junction 266.

The operation of the demodulator circuit 244 may best be explained by considering the waveforms in FIG. 6 appearing at the bottom end 130*b* of the transformer primary winding 132, conductor 256*a* from the reference signal terminals 254, the upper end of transformer secondary winding 240 and the upper end of secondary winding 242. These waveforms represent the condition when the sensing head 22 following along the pattern line 24 encounters a crossline 84 such that the image of the crossline appears only on sensitive area 60*a* as is shown in FIG. 4*b*. Under this condition no signal appears at the upper end 130*a* of transformer primary 132 as no signal is generated by the sensitive area 60*a*. However, sensitive area 60*b* generates a signal having the waveform 267*a* at the bottom end of the primary 132. This signal induces the oppositely phased signals 267b and 267c at the upper ends respectively of the oppositely wound secondaries 240 and 242. Thus, during the first half cycle of the reference signal 267d, when diode set 246 is forward biased to conduct, the signal appearing across secondary winding 242 appears across the demodulator output terminals 260, 266. During this half cycle the diode set 250 is reverse biased so that the signal appearing across secondary 240 does not appear across the output terminals 260, 266.

During the second half of the reference signal the diode sets are oppositely conditioned and set 250 is rendered conductive so that the waveform across secondary winding 240 now appears between the demodulator output terminals 260, 266. Diode set 246 is reverse biased during this half cycle so that the signal across winding 242 is blocked from the output terminals.

Thus, the output signal of the diode demodulator 244 has the waveform indicated 267e which has the same fundamental frequency as the reference signal 267d. It may be shown that if the sensing head 22 overshoots the crossline 84, such that the condition as shown in FIG. 4c results, the waveform 267a will appear at the upper end 130a of transformer primary 132. Waveforms 267b and 267c will be oppositely phased and the output waveform 267e will also be oppositely phased. It may thus be seen that the fundamental frequency component of the demodulator output is phase and amplitude oriented respective to the position of the sensing head 22 and the crossline 84.

The demodulator output is coupled through capacitor 268 to an attenuator filter circuit 270 comprising resistors 272, 274 and capacitors 276 and 278. The output of the filter 270 is connected directly to the base 280 of transistor 282 which is biased into Class A operation by bias and stabilization resistors 284 and 286. Potentiometer 287 and capacitor 289 serve as a gain control for the circuit. The amplified output of the predetermined fundamental frequency signal is taken across the load resistor 288 connected between the collector 290 and ground.

This output is directly connected to the base 292 of Class A amplifier transistor 294. The emitter collector circuit which includes resistor 296, resistor 298, diode 299, collector 300, emitter 302, resistor 304 and the RC bias stabilization combination 306 between positive D.C. voltage and ground serves as a driver for the power amplifier 308 providing the output from the crossline drive signal circuit 88.

Power amplifier 308 may be classified as a floating push-pull emitter follower type. It comprises two transistors, 310 and 312 connected in complementary-symmetry manner with the collector 314 of transistor 310 connected directly to the positive D.C. voltage source, the respective emitters 316 and 318 interconnected by resistors 320 and 322 and the collector 324 of transistor 312 directly connected to ground.

The input to the base 324 of transistor 310 is taken from a junction 325 between resistors 296, 298 in the collector circuit of transistor 294, and the input to the base 326 of transistor 312 is taken directly from the collector 300 of transistor 294. The output of the push-pull amplifier through 308 is taken from a junction 328 between the emitter resistors 320 and 322 which is coupled through capacitor 330 and normally closed contacts K1c of the drive selector relay K1 to the drive winding 53 of the resolver 50.

Transistor 294 is conducting in the quiescent state with no signal on the base 292 so that the junction 328 between the emitters of the power transistors 310 and 312 is at some quiescent level between zero and the positive D.C. voltage with the respective bases 324, 326 each biased in a slightly forward direction by means of the diode 299 and resistor 298 in the collector circuit of the transistor 294. This slight forward bias prevents any dead zone in the output signal of the amplifier.

A positive going signal at the input of transistor 294 drives transistor 312 further into conduction while cutting off transistor 310. A negative going signal at the input of transistor 294 has the opposite effect to cut off transistor 312 and drive transistor 310 further into conduction. The signal at junction 328 between the emitters 316 and 318 thus fluctuates about the quiescent state in accordance with the signal appearing at the input transistor 294. This signal of course is phase and amplitude sensitive to the direction and magnitude of the alignment of the sensing head 22 with respect to the crossline 84.

*Operation*

To initiate operation of the device an operator manually depresses switch 156 which pulls in drive selector relay K1. Power is therefore provided to the drive winding 53 of the resolver through the circuit from the signal source 154 through start and override switch 156, potentiometer 152 and contacts K1a of the drive selector relay. Means, not shown, are provided on the device for manually rotating sensing head 22 and rotor 54 of the resolver so that the operator may steer the apparatus towards the pattern line. The operator must maintain the button switch 156 depressed to provide the drive signal as the device moves without viewing the pattern line because there is no second harmonic components signal for pulling in the offline relay K2 and cross line relay K3. Contacts K2a and K3a in the hold circuit for the drive selector relay K1 therefore remain open.

As the sensing head 22 approaches the pattern line 24 the sensitive areas 60a and 60b will view the image of the pattern line to provide a second harmonic component in the sum signal $(A+B)$ at the center tap 136 of the transformer 134. Relays K2 and K3 pull in closing their respective contacts K2a and K3a in the hold circuit for drive selector relay K1, and the device follows the line automatically. The sum signal appearing at transformer center tap 136 is applied to the position signal winding 55 of the resolver 50 to correct any transverse deviation of the sensing head 22 from the pattern line, and the difference signal (a)−(b) from transformer secondary winding 142 is supplied to the rotational drive motor 44 to correct any angular deviation of the sensing head 22 with respect to the pattern line. The signal outputs from the resolver rotor windings 57, 59 provide the proper drive signals for the X and Y motors to move their respective carriages so that the sensing head 22 traces along the pattern line in the desired manner.

When the sensing head 22 encounters a crossline intersecting the pattern line the lower amplitude second harmonic component of the sum signal $\frac{1}{2}(A+B)$ causes the crossline relay K3 in the crossline and offline detector circuit 86 to deenergize and shift the drive signal input of the resolver 50 from the speed reference signal source 154 to the crossline drive signal circuit 88. The addition and subtraction circuit 58 produces phase sensitive 0 degree and 180 degree second harmonic components of the difference signal (a)−(b) which are combined in the diode demodulator 244 to produce a fluctuating signal of the predetermined frequency whose phase and amplitude are indicative of the direction and amount of displacement, respectively, of the sensing head 22 from the crossline.

The signal output from the crossline drive signal circuit 88 when the forward photosensitive area 60a views the line is of such a phase to drive the device in the forward direction. When the crossline is centered between the two sensitive areas the output of the circuit 88 has zero amplitude and the device stops. If sensing head 22 overshoots the crossline signals of opposite phase at the output of circuit 88 cause the X and Y drive motors to reverse the direction of motion of the device towards the centered position.

While a preferred embodiment of a tracing system which will automatically follow a pattern and position itself at an inconsistency in the pattern has been described in detail herein, it is understood that many modifications may be made without departing materially from the scope of this invention. For example, there may be many variations in the type of sensing head utilized such that the sensing means senses different segments of the pattern contour and produces separate signals from which may be derived the drive signal for centering the sensing head with respect to the inconsistency on the pattern contour.

As one example of such a modification the vibrating shade 63 of the sensing head might be caused to vibrate about an axis perpendicular to the sensitive areas and intersecting the front-to-back axis of the sensing head. In this event, the difference signal $(a)-(b)$ becomes the transverse deviation signal and the sum $(a)+(b)$ becomes the angular deviation signal. The sum signal is still used for operating the offline and crossline switching circuit 86, while the difference is used, for providing the crossline drive signal. Other types of scanning means which might be used include vibrating or rotating photocells and vibrating or rotating mirrors or lenses.

It is also feasible to adapt these teachings to tracer systems using a drive wheel for moving the sensing head and the attached work tool. In this case the transverse deviation signal would be used to steer the drive wheel in the event of a deviation and the angular deviation signal would not be required. The transverse deviation signal would also be used to switch the forward drive means from the reference speed source to the crossline drive circuit and the crossline drive circuit would operate in a manner as described for the present embodiment.

It is therefore the intention of applicants to be bound not by the detailed discussion of the preferred embodiment, disclosed in this specification, but only by the scope of the appended claims.

What is claimed is:

1. A system for tracing along a pattern line to a crossline comprising a sensing head rotatable about an axis and having a front-to-back axis, said sensing head comprising photosensitive means for sensing at a predetermined frequency different segments of the pattern line equally spaced in front of and in back of said rotation axis and producing separate electric signals respectively related to said segments, drive means for translating said sensing head with respect to said pattern line, means providing a first drive signal to drive said sensing head in a forward direction at a constant speed, means for producing a signal proportional to the sum of said electric signals, means for producing a signal proportional to the difference of said electric signals whereby one of said sum and difference signals is indicative of the transverse displacement of the front-to-back axis of the sensing head from the pattern line, and the other of said sum and difference signals is indicative of the angular deviation, means responsive to one of said sum and difference signals for rotating said sensing head to angularly align said front-to-back axis with the segments of the line being sensed, means responsive to one of said sum and difference signals for providing a positional signal to said drive means to positionally align said front-to-back axis with respect to the segments of the pattern line being sensed, means in receipt of said difference signal for producing a second drive signal indicative of the amount and direction of the deviation between the image of said crossline and said axis of rotation, means alternately connecting one of said drive signals to said drive means, means for activating said connecting means to connect said first drive signal to said drive means only upon the presence of a second harmonic component of said predetermined frequency in said sum signal, said last mentioned means also being responsive to a reduced amplitude of said second harmonic component of said sum signal caused by said sensing means encountering the crossline for deactivating said connecting means whereby said second drive signal is connected to said drive means to drive said sensing head to center said rotation axis with respect to said crossline.

2. A system for tracing along a pattern line to a crossline comprising a sensing head rotatable about an axis and having a front-to-back axis, said sensing head comprising photosensitive means for sensing at a predetermined frequency different segments of the pattern line equally spaced in front of and in back of said rotation axis and producing separate electric signals respectively related to said segments, drive means for translating said sensing head with respect to said pattern line, a resolver for energizing said coordinate drive means, means providing a first drive signal of said predetermined frequency and phase connectable to said resolver for energizing said coordinate drive means to drive said sensing head in a forward direction at a constant speed, means for producing a signal proportional to the sum of said electric signals, means for producing a signal proportional to the difference of said electric signals whereby one of said sum and difference signals is indicative of the transverse displacement of the front-to-back axis of the sensing head from the pattern line, and the other of said sum and difference signals is indicative of the angular deviation, means responsive to one of said sum and difference signals for rotating said sensing head to angularly align said front-to-back axis with the segments of the line being sensed, means responsive to the other of said sum and difference signals for providing a positional signal to said resolver to positionally align said front-to-back axis with respect to the segments of the line being sensed, means in receipt of said difference for producing a second drive signal of said predetermined frequency whose amplitude and phase are indicative of the amount and direction of the deviation between the image of said crossline and said rotation axis, means for alternately connecting one of said drive signals to said resolver, means for activating said connecting means to connect said first drive signal to said resolver only upon the presence of a second harmonic component in said sum, said last mentioned means also being responsive to a reduced amplitude of said second harmonic component of said sum caused by said sensing means encountering the crossline for deactivating said connecting means whereby said second drive signal is connected to said resolver and said coordinate means drives said sensing head to center said rotating axis with respect to said crossline.

3. The system of claim 2 including manually operable means for overriding said connecting means to cause said drive means to drive said sensing head without the presence of an image of the pattern line on said sensing means.

4. A system for tracing along a pattern line to a crossline comprising a rotatable sensing head having a front-to-back axis, said sensing head comprising photosensitive means having a pair of elongated sensitive areas aligned parallel to one another transverse to the front-to-back axis of said sensing head and arranged to have an image of a different segment of the pattern line cast upon each sensitive area, said sensitive areas spaced from one another a distance less than the width of said crossline, each of said sensitive areas adapted to cause fluctuation of an electric signal proportionate to variations in light intensity, means for modulating said images at a predetermined frequency and phase, coordinate drive means for translating said sensing head with respect to said pattern line, a resolver for energizing said coordinate drive means, means providing a first drive signal of said predetermined frequency and phase connectable to said resolver for energizing said coordinate drive means to drive said sensing head in a forward direction at a constant speed, means for producing a signal proportional to the sum of said electric signals, means for producing a signal proportional to a difference of said electric signals whereby one of said sum and difference signals is indicative of the transverse displacement of the front-to-back axis of the sensing head from the pattern line, and the other of said sum and difference signals is indicative of the angular deviation, means responsive to one of said sum and difference signals for rotating said sensing head to angularly align said front-to-back axis with the segments of the line being sensed, means responsive to the other of said sum and difference signals for providing a positional signal to said resolver to positionally align said front-to-back axis with respect to the segments of the line being sensed, means in receipt of said difference for producing a second drive signal of said predetermined frequency whose amplitude and phase are indicative of the amount and direction of the deviation between the image of said crossline and a line midway between said sensitive areas, means for alternately connecting one of said drive signals to said resolver, means for activating said connecting means to connect said first drive signal to said resolver only upon the presence of a second harmonic component in said sum signal, said last mentioned means also being responsive to a reduced amplitude of said second harmonic component of said first combined signal caused by at least one of said sensitive areas encountering said crossline for deactivating said connecting means whereby said second drive signal is connected to said resolver and said coordinate drive means drives said sensing head to center said sensitive areas with respect to said crossline.

5. The system of claim 4 including manually operated means for overriding said connecting means to cause said drive means to cause said coordinate drive means to drive said sensing head without the presence of image of said pattern line on said sensitive areas.

6. A system for tracing along a pattern line to a crossline comprising a rotatable sensing head having a front-to-back axis, said sensing head comprising photosensitive means having a pair of elongated sensitive areas aligned parallel to one another transverse to the front-to-back axis of said sensing head and arranged to have an image of a different segment of the pattern line cast upon each sensitive area, said sensitive areas spaced from one another a distance less than the width of said crossline, each of said sensitive areas adapted to cause fluctuation of an electric signal proportionate to variations in light intensity, means for modulating said images at a predetermined frequency and phase means for rotating said sensing head with respect to said pattern line, coordinate drive means for translating said sensing head with respect to said pattern line, a resolver for energizing said coordinate drive means, means providing a first drive signal of said predetermined frequency and phase connectable to said resolver for energizing said coordinate drive means to drive said sensing head in a forward direction at a constant speed, means for producing a signal proportional to the sum of said electric signals, means for producing a signal proportional to the difference of said electric signals whereby the predetermined frequency component of one of said sum and difference signals is indicative of the transverse displacement of the front-to-back axis of the sensing head from the pattern line, and the other of said sum and difference signals is indicative of the angular deviation, means responsive to the predetermined frequency component of one of said sum and difference signals for energizing said rotating means to angularly align said front-to-back axis with the segments of the line being sensed, means responsive to the predetermined frequency components of the other of said sum and difference signals for providing a positional signal to said resolver to positionally align said front-to-back axis with respect to the segments of the line being sensed, means for splitting the phase of said difference signal, demodulator means in receipt of the output of said phase splitting means for producing a second drive signal of said predetermined frequency, whereby the amplitude and phase thereof are indicative of the amount and direction of the deviation between the image of said crossline and a line midway between said sensitive areas, switch means for alternately connecting one of said drive signals to said resolver, means for activating said switch means to connect said first drive signal to said resolver only upon the presence of a second harmonic component in said sum signal, said last mentioned means also being responsive to a reduced amplitude of said second harmonic component of said other signal caused by at least one of said sensitive means encountering said crossline for deactivating said switch means whereby said second drive signal is connected to said resolver and said coordinate drive means drives said sensing head to center said sensitive areas with respect to said crossline.

7. The system of claim 6 including manually operated means for overriding said connecting means to cause said coordinate drive means to drive said sensing head without the presence of an image of the pattern line on said sensitive areas.

8. A system for tracing along a pattern line to a crossline comprising a rotatable sensing head having a front-to-back axis, said sensing head comprising photosensitive means having a pair of elongated sensitive areas aligned parallel to one another transverse to the front-to-back axis of said sensing head and arranged to have an image of a different segment of the pattern line cast upon each sensitive area, said sensitive areas spaced from one another a distance less than the width of said crossline, each of said sensitive areas adapted to cause a fluctuation of an electric signal proportionate to variations in light intensity, means for modulating said images oscillating at a predetermined frequency and phase with equal amplitude across a plane containing the front-to-back axis of said sensing head, electric motor means for rotating said sensing head with respect to said pattern line, coordinate drive means for translating said sensing head with respect to said pattern line, a resolver for energizing said coordinate drive means, means providing a first drive signal of said predetermined frequency and phase connectable to said resolver for energizing said coordinate drive means to drive said sensing head in a forward direction at a constant speed, means for producing a signal proportional to the sum of said electric signals, means for producing a signal proportional to the difference of said electric signals whereby the predetermined frequency components of said sum and difference signals are indicative of the transverse and angular displacements, respectively, of the front-to-back axis of the sensing head from the pattern line, means responsive to said predetermined frequency components of said difference signal for energizing said electric motor means to angularly align said front-to-back axis with the segments of the line being sensed, means responsive to the predetermined frequency components of said sum signal for providing a positional signal to said resolver to positionally align said front-to-back axis with respect to the segments of the line being sensed, means for splitting the phase of said difference signal, a diode demodulator in receipt of a reference signal of said predetermined frequency and phase and in receipt of the output of said phase splitting means for producing a second drive signal of said predetermined frequency, whereby the amplitude and phase thereof are indicative of the amount and direction respectively of the deviation between the image of said crossline and a line midway between said sensitive areas, first switch means for alternatively connecting one of said drive signals to said resolver, means including second and third switch means for activating said first switch means to connect said first drive signal to said resolver only upon the presence of a second harmonic component in said sum signal, said last mentioned means also being responsive to a reduced amplitude of said second harmonic component in said sum signal caused by at least one of said sensitive areas encountering said crossline for deenergizing only said second switch means to deactivate said first switch means whereby said second drive signal is connected to said resolver and said coordinate drive means drives said sensing head to center said sensitive areas with respect to said crossline.

9. The system of claim 8 including manual means for overriding said second and third switch means to cause said coordinate drive means to drive said sensing head without the presence of an image of the pattern line on said sensitive areas.

10. A system for tracing a pattern line to a crossline thereto comprising a sensing head, photosensitive means in said head deriving fluctuating output signals responsive to the positional relationship of the image of such pattern line with respect thereto, means responsive to said output signals for driving said sensing head along the center of said pattern line, and means also responsive to said output signals for positioning said sensing head with the image of said crossline centered with respect to said photosensitive means.

11. A system for tracing along a pattern contour to an inconsistency therein, comprising a sensing head, photosensitive means in said head deriving fluctuating output signals of a predetermined frequency responsive to the position of the image of the pattern contour with respect thereto, means responsive to said output signals for driving said sensing head along the pattern contour, and means responsive to an even harmonic in said output signals for positioning said sensing head with the image of said inconsistency centered with respect to said photosensitive means.

12. A system for tracing a pattern line to a crossline thereto comprising a sensing head, photosensitive means in said head deriving fluctuating output signals of a predetermined frequency responsive to the position of the image of the pattern line with respect thereto, means responsive to said output signals for driving said sensing head along the center of said pattern line, and means responsive to even harmonic components in said output signals for positioning said sensing head with the image of said crossline centered with respect to said photosensitive means.

13. A system for tracing along a pattern line to a crossline thereto comprising a sensing head, photosensitive means in said head deriving fluctuating output signals responsive to the position of the image of the pattern line with respect thereto, means for resolving the output signals into resultant signals indicative of the angular and transverse deviations of the sensing head from the pattern line, means responsive to the resultant signals for driving the scanning head along the center of the pattern line, and means also responsive to said resultant signals for positioning said sensing head with the image of said crossline centered with respect to said photosensitive means.

14. A system for tracing along a pattern line to a crossline thereto comprising a sensing head, photosensitive means in said head having a pair of sensitive areas each positioned to have an image of a different segment of the line cast thereon, means for modulating the images on said sensitive areas to produce a pair of fluctuating output signals thereon, means for resolving the output signals into resultant signals indicative of the angular and transverse deviations of the sensing head from the pattern line, means responsive to the resultant signals for driving the scanning head along the center of the pattern line, and means also responsive to said signals for positioning said sensing head with the image of said crossline centered between said sensitive areas.

15. A system for tracing along a pattern line to a crossline thereto comprising a sensing head, photosensitive means in said head having a pair of sensitive areas each positioned to have an image of a different segment of the line cast thereon, means for modulating the images on said sensitive area to produce a pair of fluctuating output signals therefrom, means for resolving the output signals into resultant signals indicative of the angular and transverse deviations of the sensing head from the pattern line, means responsive to the resultant signals for driving the scanning head along tre center of the pattern line, means responsive to one of said resultant signals for stopping said sensing head at a break in said line, and means responsive to said output signals for driving said sensing head to a position at which the image of said crossline is centered between said sensitive areas.

16. A system for tracing along a pattern line to a crossline thereto comprising a sensing head, photosensitive means in said head having a pair of sensitive areas each positioned to have an image of a different segment of the line cast on each of the sensitive areas, means for modulating the images on said sensitive area to produce a pair of fluctuating output signals therefrom, means for resolving the output signals into resultant signals indicative of the angular and transverse deviations of the sensing head from the pattern line, means responsive to the resultant signals for driving the scanning head along the center of the pattern line, means responsive to the of said resultant signals for disenabling said driving means upon sensing of the image of the crossline, and and means responsive to the other of said resultant signals and conditioned by said disenabling means for driving said sensing means to a position at which the image of said crossline is centered between said sensitive areas.

17. A system for tracing a pattern line to a crossline thereto comprising a sensing head, photosensitive means in said head having a pair of sensitive areas each positioned to have an image of a different segment of the line cast thereon, means for modulating said images in a substantially linear motion transverse to said pattern line to produce a pair of fluctuating output signals therefrom, means for resolving the output signals into resultant signals indicative of the angular and transverse deviations of the sensing head from the pattern line, means responsive to the resultant signals for driving the scanning head along the center of the pattern line, means responsive to the resultant signal indicative of said transverse deviation for disenabling said driving means upon sensing of the image of said crossline, and means responsive to said resultant signals indicative of the angular deviation and conditioned by said disabling means for driving said sensing head to a position at which the image of said crossline is centered between said sensitive areas.

References Cited

UNITED STATES PATENTS

| | | | |
|---|---|---|---|
| 2,996,621 | 8/1961 | Barrett | 250—202 |
| 3,209,152 | 9/1965 | Brouwer | 250—202 |
| 3,214,661 | 10/1965 | Duff | 250—202 X |

RALPH G. NILSON, *Primary Examiner.*

M. A. LEAVITT, *Assistant Examiner.*

UNITED STATES PATENT OFFICE

CERTIFICATE OF CORRECTION

Patent No. 3,369,123 February 13, 1968

Francis G. Bardwell et al.

It is hereby certified that error appears in the above numbered patent requiring correction and that the said Letters Patent should read as corrected below.

Column 12, line 72, for "a" second occurrence, read -- the --; column 16, line 30, for "the" third occurrence, read -- one --; line 32, strike out "and"; line 52, for "signals" read -- signal --.

Signed and sealed this 22nd day of April 1969.

(SEAL)
Attest:

Edward M. Fletcher, Jr.
Attesting Officer

EDWARD J. BRENNER
Commissioner of Patents